Oct. 20, 1925.

W. C. LIVINGSTON

LONG HORN CHEESE CUTTER

Filed May 1, 1924  2 Sheets-Sheet 1

1,558,377

Inventor
W. C. Livingston.

By [signature]
Attorney

Oct. 20, 1925.
W. C. LIVINGSTON
LONG HORN CHEESE CUTTER
Filed May 1, 1924     2 Sheets-Sheet 2
1,558,377
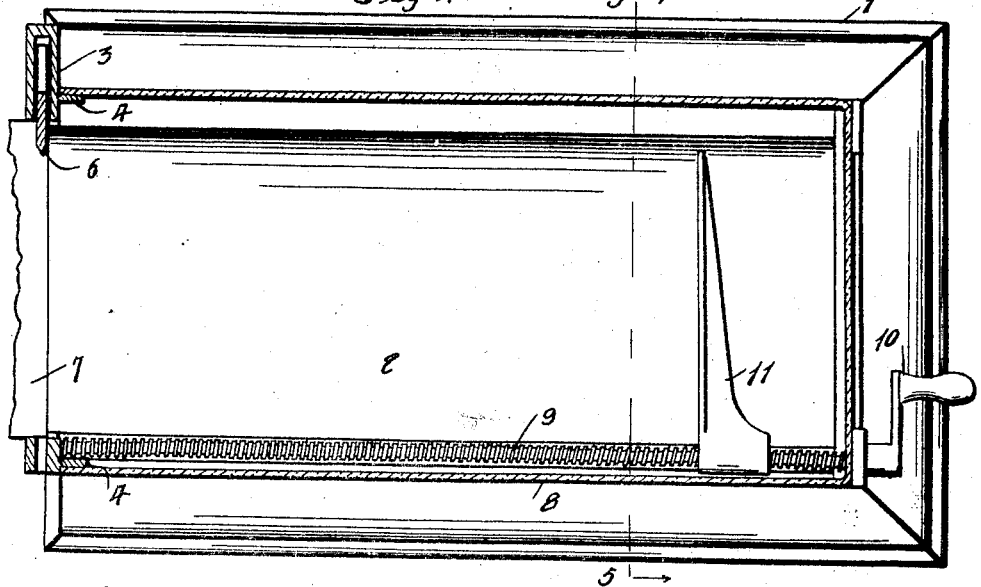
Fig. 4.
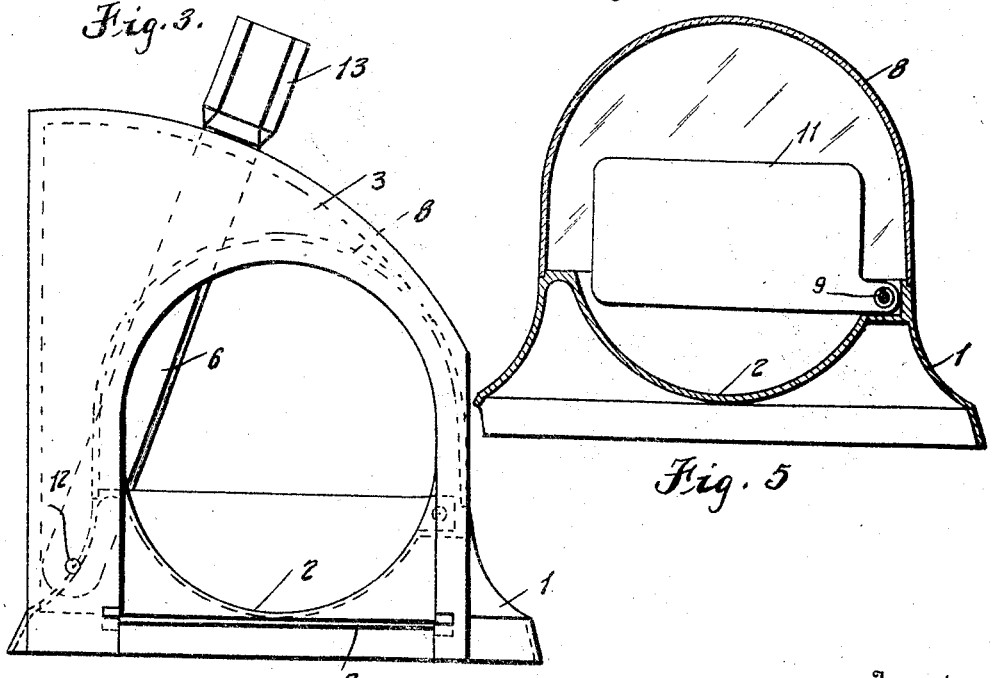
Fig. 3.
Fig. 5.
Inventor
W. C. Livingston
By
Attorney Patented Oct. 20, 1925.

1,558,377

UNITED STATES PATENT OFFICE.

WILLIAM C. LIVINGSTON, OF NEWTON, KANSAS.

LONG-HORN-CHEESE CUTTER.

Application filed May 1, 1924. Serial No. 710,371.

*To all whom it may concern:*

Be it known that I, WILLIAM C. LIVINGSTON, a citizen of the United States, residing at Newton, in the county of Harvey and State of Kansas, have invented certain new and useful Improvements in Long-Horn-Cheese Cutters; and I do hereby declare the following to be a full, clear, and exact description of the invention, such as will enable others skilled in the art to which it appertains to make and use the same.

The present invention relates to a cutting machine for slicing food, and specifically provides a cheese cutter which also encloses the cheese to prevent the same from drying or becoming contaminated by dust, insects or promiscuous handling.

In accordance with the invention, the machine includes a base to receive the cheese or other commodity to be sliced or cut into required portions, a cover preferably of glass fitted to the base and enclosing the cheese or other article and admitting of the same being seen while protecting it from drying, or from the attack of insects, or the settling of dust thereon, a cutting mechanism and means for positively feeding the article to the cutting mechanism.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
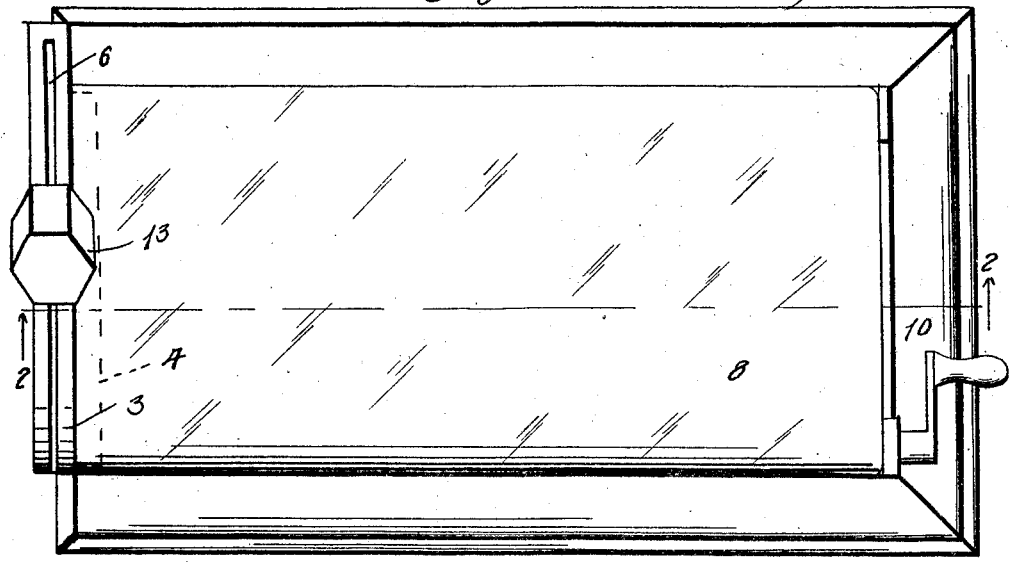
Figure 2:
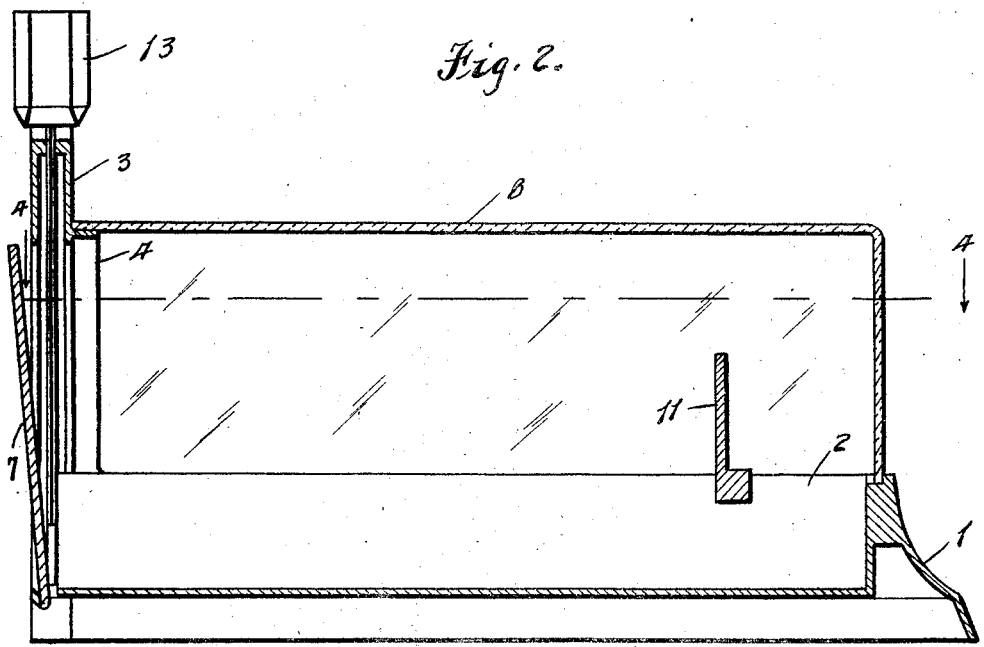

Referring to the accompanying drawings forming a part of the application:

Figure 1 is a top plan view of a machine of the character aforesaid embodying the invention, Figure 2 is a vertical longitudinal section thereof on the line 2—2, Figure 3 is an end view of the machine, Figure 4 is a horizontal section on the line 4—4 of Figure 2, and Figure 5 is a transverse section on the line 5—5 of Figure 4.

Corresponding and like parts are referred to in the following description and designated in the several views of the drawings by like reference characters.

The numeral 1 designates the base of the machine which may be of any construction and in the present instance is cast of aluminum. The top of the base is longitudinally depressed to form a trough 2 for the reception of the long horn cheese or other article to be cut up or sliced. A vertically disposed frame 3 is located at one end of the base and an offstanding flange 4 projects rearwardly therefrom. The frame 3 comprises spaced portions and is formed with an opening through which the portion of the cheese to be cut projects. The cutter 6 cooperates with the frame 3 and is directed in its movements thereby to insure the slice cut being of uniform thickness throughout. A plate 7 is pivoted to the lower portion of the frame 3 and is adapted to be turned upwardly so as to close the opening in the frame 3 when the machine is not required for immediate operation. When the plate 7 is turned to occupy a horizontal position it forms a support for the slices cut from the cheese or other article. A cover 8 preferably of glass is supported upon the base 1 and extends over the cheese or other article to prevent the same from drying out, or collecting dust, or becoming contaminated by insects, or by promiscuous handling. The cover being of glass admits of the article being readily observed while at the same time protecting the same in the manner stated.

A feed screw 9 is disposed at one side of the base and mounted thereon and is provided at one end with a handle 10. An arm 11 has one end threaded to the feed screw 9 and extends across the base to engage the cheese or other article placed in the trough 2, whereby to feed the same when the screw 9 is rotated by means of the handle 10.

The cutter 6 is arranged to operate between the spaced portions of the frame 3 and is pivoted at one end to the frame, as indicated at 12, the other end projecting and having a handle 13 fitted thereto.

What is claimed is:

A slicing machine end structure U-shaped in cross section having walls integral with each other and spaced apart longitudinally of the machine, said end having a discharge opening for the material through said walls, said opening being nearer distal sides of said walls than the proximal side thereof, a knife guided by and operable intermediate said walls, said knife being pivoted to the walls adjacent the lower corner of the proximal side thereof, said knife being movable to a position completely exposing said opening to accommodate a closure in the latter, and a cover-supporting flange integral with the innermost wall extending around said opening and laterally from said innermost wall to reinforce the structure.

In testimony whereof I affix my signature.

WILLIAM C. LIVINGSTON.